(12) United States Patent
Cottle et al.

(10) Patent No.: US 11,774,027 B2
(45) Date of Patent: Oct. 3, 2023

(54) EMERGENCY LEAK CLAMP

(71) Applicant: GAS TECHNOLOGY INSTITUTE, Des Plaines, IL (US)

(72) Inventors: Travis Cottle, Glenview, IL (US); Jeffrey Mainzer, Wheeling, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 0 days.

(21) Appl. No.: 17/528,753

(22) Filed: Nov. 17, 2021

(65) Prior Publication Data
US 2022/0154868 A1 May 19, 2022

Related U.S. Application Data

(60) Provisional application No. 63/114,661, filed on Nov. 17, 2020.

(51) Int. Cl.
*F16L 55/17* (2006.01)
*F16L 55/07* (2006.01)

(52) U.S. Cl.
CPC ............... *F16L 55/17* (2013.01); *F16L 55/07* (2013.01)

(58) Field of Classification Search
CPC .................................. F16L 55/17; F16L 55/07
USPC ............................................................. 138/99
See application file for complete search history.

(56) References Cited

U.S. PATENT DOCUMENTS

| | | | | |
|---|---|---|---|---|
| 1,964,642 A * | 6/1934 | McCoy | ................. | F16L 55/172 285/337 |
| 4,789,189 A * | 12/1988 | Robertson | ............... | F16L 41/06 285/373 |
| 5,437,489 A | 8/1995 | Sanders et al. | | |
| 5,443,096 A | 8/1995 | King | | |
| 5,771,938 A * | 6/1998 | McKenzie | ............... | F16L 55/17 138/97 |
| 9,004,813 B2 * | 4/2015 | Al-Buraik | ............ | F16L 41/002 405/60 |
| 9,175,799 B2 | 11/2015 | Clark et al. | | |
| 9,739,410 B2 * | 8/2017 | Skinner | ................. | F16L 55/172 |
| 10,663,103 B2 * | 5/2020 | Strother | .............. | F16L 55/1705 |
| 2010/0012215 A1 * | 1/2010 | Morton | ................. | F16L 55/172 138/99 |

(Continued)

FOREIGN PATENT DOCUMENTS

| | | |
|---|---|---|
| EP | 2 600 051 A1 | 6/2013 |
| GB | 2505528 A | 3/2014 |

OTHER PUBLICATIONS

InduMar Products, Inc., "stop-it-pipe-repair-clamp," Retrieved: Oct. 29, 2021 (1 pp.), Houston, TX. https://www.indumar.com/products/leak-sealign/stop-it-pipe-repair-clamp/#.

*Primary Examiner* — Patrick F Brinson
*Assistant Examiner* — David R Deal
(74) *Attorney, Agent, or Firm* — Pauley Erickson & Swanson (57) ABSTRACT

A device and method for sealing a leak in a pipe. The device includes a sealing component that is placed against a pipe outer surface and over the leak. A clamp extending from the sealing component clamps partially around a circumference of the pipe and pulls the sealing component against the pipe. A vent in combination with the sealing member releases leaking gas through or around the sealing component while the sealing component is being secured to the pipe. The vent is then closed after full clamping is completed.

19 Claims, 10 Drawing Sheets

(56) References Cited

U.S. PATENT DOCUMENTS

2012/0216901 A1* 8/2012 Dickinson ........... F16L 55/1715
138/99

* cited by examiner

EMERGENCY LEAK CLAMP

CROSS REFERENCE TO RELATED APPLICATION

This application claims the benefit of U.S. Provisional Application, Ser. No. 63/114,661, filed on 17 Nov. 2020. The co-pending provisional application is hereby incorporated by reference herein in its entirety and is made a part hereof, including but not limited to those portions which specifically appear hereinafter.

BACKGROUND OF THE INVENTION

This invention relates generally to an emergency leak clamp and, more particularly, to an external clap device for creating a seal on a leaking gas pipe.

Underground gas lines are sometimes hit during excavation. This can cause a puncture in the gas line leading to a gas leak. The gas leak can be of highly pressurized gas, for example up to 90 psi, and therefore needs to be quickly contained. Often when gas leaks happen there is not a quick or easily accessible method or tool to contain the leak.

There are multiple ways that companies currently will attempt to cut-off gas supply in a leaking gas pipe. This is primarily done using a shut-off valve that can be turned on either side of the leaking pipe. The shut-off valve will stop the supply of gas to the pipe. A squeeze-off tool is another example which compresses and deforms a plastic gas pipe so that no gas can pass through the plastic pipe. These current options for containing and repairing a gas leak stop gas from reaching the gas leak. However, these options also halt gas services to customers, are time consuming to implement, and can cause further damage to the subject gas pipes.

Therefore, there is a need for an improved method and device for containing a leak in a gas pipe quickly and efficiently so that the leak may be fixed by local distribution companies in a safe environment.

SUMMARY OF THE INVENTION

The invention generally relates to a clamp device that can be used for sealing a leak in a gas pipe.

The general object of the invention can be attained, at least in part, through a clamp device that is remotely lowered over a leaking gas pipe. The clamp device includes an actuator, e.g., one or more hydraulic or pneumatic cylinders. The actuator causes a body of the clamp device to clamp onto a pipe. Once the clamp device is on a pipe, the actuator also aids the clamp device to physically draw the pipe closer to the device so that an outer surface of the pipe can make contact with a sealing component on the body of the device.

Embodiments of this invention include a device for sealing a leak in a pipe, with a sealing component including a peripheral surface curved to fit against the pipe. A clamp extends from the sealing component. The clamp includes a clamp arm extending from the sealing component on each of opposing sides of the peripheral surface. The peripheral surface is adapted to fit about the leak, and can surround an internal cavity, such as to configured to contain and/or vent leaking gas.

To achieve a sufficient seal, the clamp device can further include a metallic rib and/or a rubber gasket. While the metallic rib and rubber gasket may be used together, in other embodiments of the invention, either a metallic rib or a rubber gasket may be used. Both the metallic rib and the rubber gasket preferably include a curvature to generally follow a curvature of a circumference of the damaged pipe. The metallic rib and the rubber gasket are preferably situated at a center of the clamp section, below the hydraulic cylinder.

Hydraulic or pneumatic forces on the clamp can drive the sealing component onto or partially into the pipe wall. The metallic rib can dig into the pipe and partially puncture a plastic pipe wall to create the seal. The rubber gasket is pushed so that the rubber gasket compresses on the pipe wall. The combination of the metallic rib and the rubber gasket creates a double seal on the pipe. In some embodiments of the invention, the device can be used with just the metallic rib or just the rubber gasket to form a seal on the pipe.

In embodiments of this invention, the sealing/clamping device includes a sealing component configured to extend over the leak, a clamp extending from the sealing component and configured to clamp partially around a circumference of the pipe and secure the sealing component against the pipe, and a vent configured to release gas from the leak while the sealing component is being secured to the pipe. The vent allows for gas to escape from the leaking pipe while the seal is formed between the body of the device and the pipe. The vent stack aids in securing the clamp device to the pipe so that a high level of pressure does not form under or within an internal cavity of the clamp device while the seal is forming. The vent stack prevents the bottom surface or any internal cavity from becoming pressurized during the seal formation by the hydraulics of the device, resulting in a tighter seal formed on the pipe wall. Once the gasket and the metallic rib have created the seal on the pipe, the vent stack is closed to fully contain the gas leak within the pipeline and the body of the clamp device.

Various numbers of vent stacks and/or hydraulic/pneumatic pistons can be used, depending on need. Embodiments of this invention desirably include two vents and/or only one central hydraulic/pneumatic action. In some embodiments, particularly for plastic pipes, the sealing component cavity does not require any flexible material (e.g. rubber) seal, but simply relies on a sharp edge about a cavity to partially puncture, e.g., dig/press partially into, the pipe outer wall to create a seal.

In some embodiments there are two actions for the clamp. The first is a mechanical action relying on a spring loaded clamp, such that when the clap arms are pushed onto the pipe, they spring outward, go around the pipe and lock in place on the opposite side. Then once the clamp arms are around, or on the back side of, the pipe, a hydraulic or pneumatic is activated to fully close the clamp and pull/push the sealing component edge into the pipe. Then the sealing component partially cuts into the surface of the pipe to create a better seal with the pipe.

The invention further includes a method for sealing a leak in a pipe. The method includes placing a sealing component adjacent the pipe; clamping the sealing component against the pipe and over the leak; venting leaking gas though the sealing member during the clamping; and closing the venting upon completion of the clamping. The method can be performed using any device disclosed herein.

Other objects and advantages will be apparent to those skilled in the art from the following detailed description taken in conjunction with the appended claims and drawings.

DETAILED DESCRIPTION OF THE INVENTION

The present invention provides a clamp device for clamping around, and sealing off, a portion of a pipe when the pipe contains a gas leak. The clamp device desirably utilizes hydraulics or pneumatics to move various components in place around a damaged gas pipe. The clamp device forms an air-tight seal around the damaged area of the pipe so the gas leak can be contained.

Damage to gas pipes can occur during excavations and other disturbances. The clamp device is deployed for use at the same location of a gas leak. This eliminates the need to perform any additional excavations to service and contain the leak. The clamp device also does not stop the flow of gas through the service line. Instead, use of the clamp device contains leaking gas while also maintaining gas service to gas line customers.

The clamp device of the claimed invention can be applied directly to a section of damaged pipe without sacrificing the integrity of the remaining pipe, and without cutting off gas supply to consumers. In embodiments of this invention, the clamp device includes at least one claw-like clamp section that can be alternated between closed (clamped) and opened (unclamped) positions for fitting around a pipe. An actuator (e.g., a hydraulic cylinder) extends above the clamp section and the pipe surface to alternate the clamp section between the closed and opened positions. A central clamp body/ section also acts as a sealing component for achieving a sufficient seal around a damaged pipe when the clamp section is closed by the hydraulic cylinder.

Figure 1:
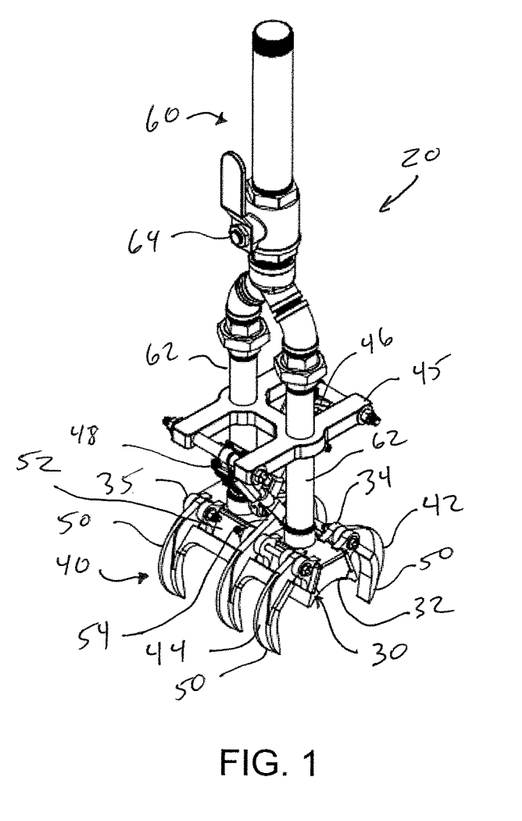
FIG. 1 is a perspective view of a clamp device, according to one embodiment of the invention.
Figure 2:
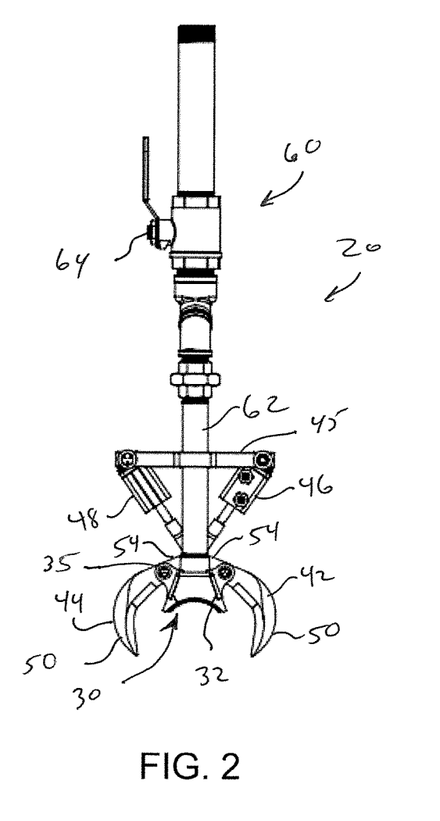
FIG. 2 shows a side view of the clamp device according to the embodiment shown in FIG. 1.
Figure 3:
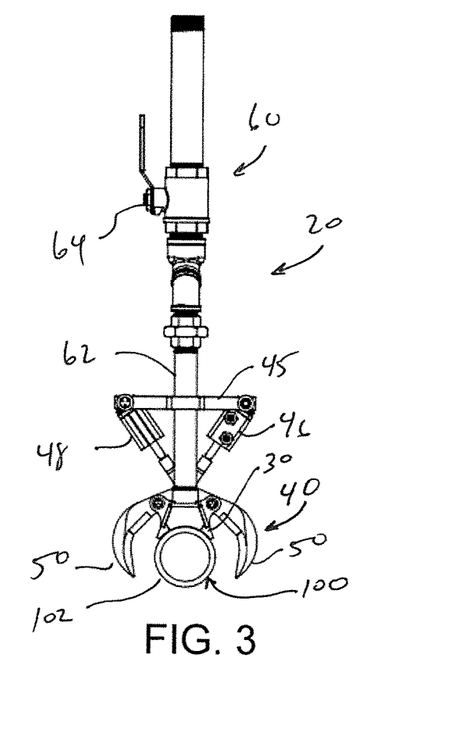
FIGS. 3-5 are side views of the clamp device according to the embodiment shown in FIG. 1 in relation to a pipe.
Figure 4:
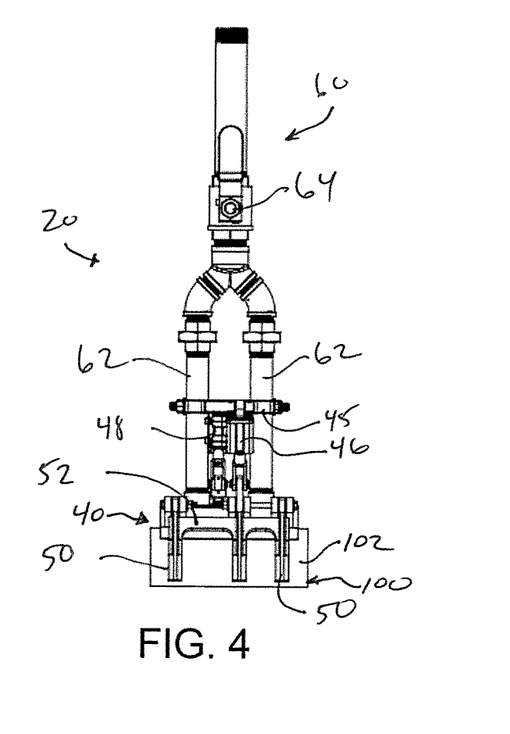
Figure 5:
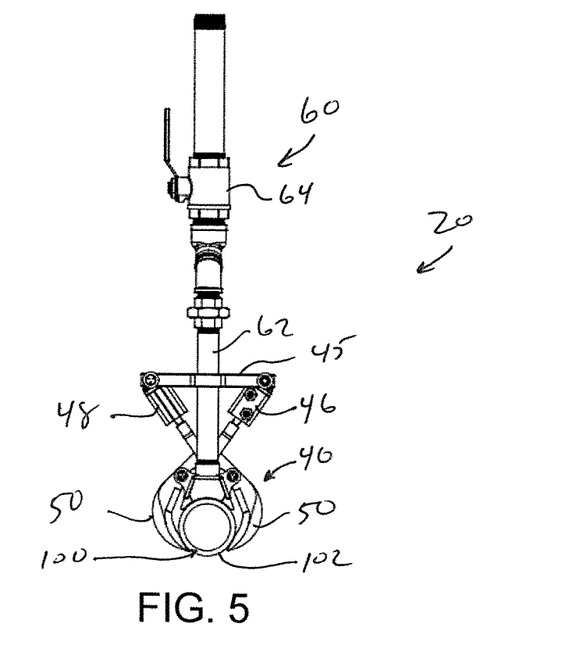

FIGS. 1-7 show a device 20 according to one embodiment of this invention. The device 20 includes a sealing component 30 that is configured to fit over and cover the leak. The sealing component 30 desirably includes a curved surface 32 that corresponds to the curvature of the outer surface 102 of the pipe 100, such as shown in FIGS. 3 and 5.

The device 20 includes a clamp 40 connected to and extending from the sealing component 30. The clamp 40 includes clamp arms 42 and 44, each connected on opposing sides of the sealing component 30. Each clamp arm 42, 44 is pivotably mounted to the sealing component 30, such as to flanges 35 extending from the sides of the sealing component 30. The clamp arms 42, 44 are connected to an actuator that controls the open and closing movement of the clamp arms 42, 44. In the illustrated embodiment, the actuator includes two pistons 46 and 48, connected between the clamp arms 42, 44, respectively, and a frame 45 or other support component of the device 20. The pistons 46, 48 are desirably hydraulic or pneumatic pistons, controlled and powered by any suitable control device (not shown). Other actuators can be used, such as a mechanical gearing. The pistons 46, 48 are each connected to a corresponding clamp lever 54, such that, as illustrated, pulling on the levers 54 pivots and closes the clamp arms 42, 44 about the pipe 100.

Various sizes, shapes, and configurations of the clamp arms can be used, depending on need. As illustrated, each clamp arm 42, 44 includes three clamp fingers 50 along a clamp arm body 52 having a length matching or approximating the length of the sealing component 30. As shown in FIG. 5, the clamp fingers are curved and sized to desirably at least partially extend around the pipe a sufficient distance to pull the sealing device 20 against the outer surface 102 of the pipe 100 when the clamp arms 42, 44 are closed, as shown in FIG. 5.

In embodiments of this invention, the device also includes a vent. The vent allows gas to continue to escape from the pipe and through the clamp device during the sealing process and while the clamp device creates the seal. The use of the vent allows for a tighter mechanical seal to be formed on the pipe before the device is closed and the clamp device is pressurized. The vent therefore maintains a reduced pressure in the device while the clamp device is being installed. With the vent, the clamp device can move easily over the leak in the pipe as no internal pressure will be working against the device. The vent avoids excess pressure forcing the clamp device away from the pipe.

Figure 6:
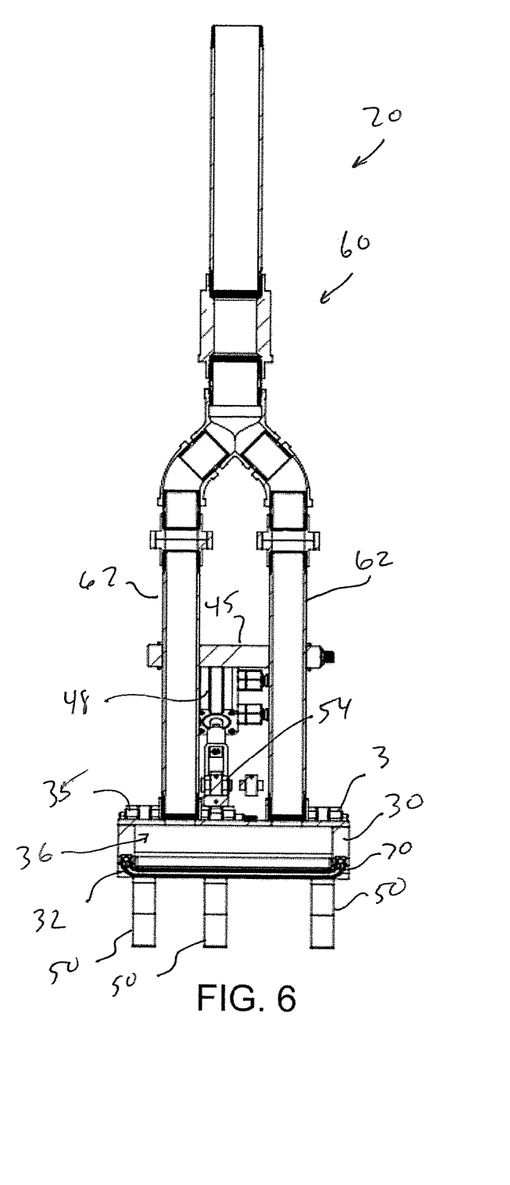
FIG. 6 is a sectional view of the clamp device according to the embodiment shown in FIG. 1.
Figure 7:
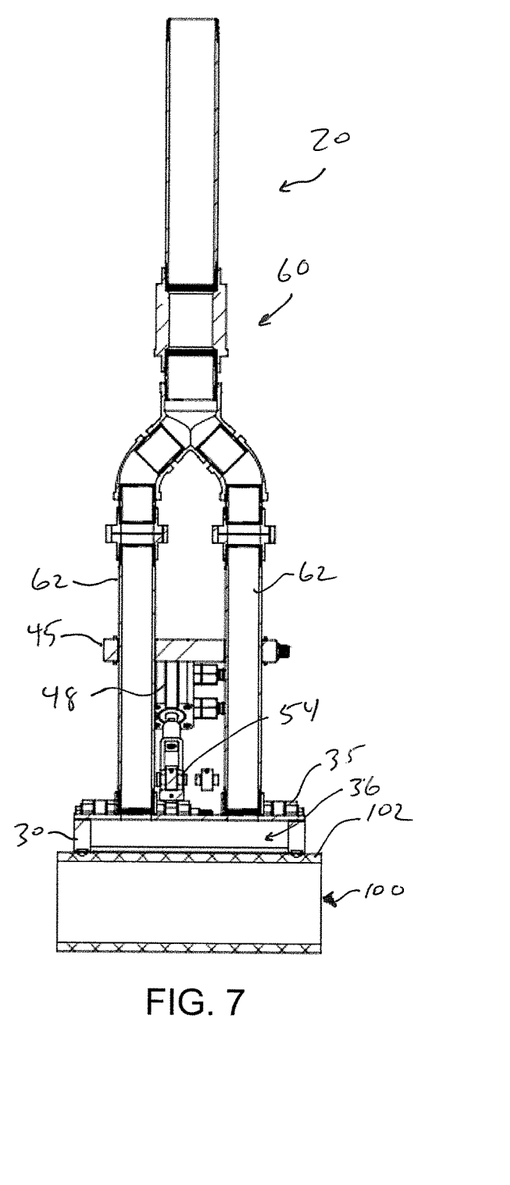
FIG. 7 is a sectional view of the clamp device according to the embodiment shown in FIG. 1, against a pipe.
Figure 8:
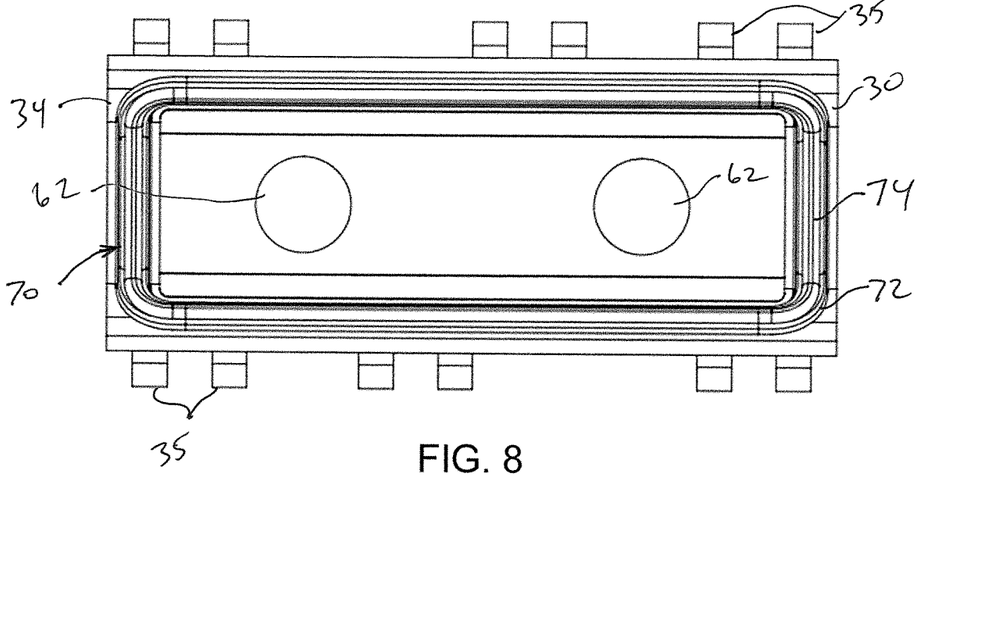
FIG. 8 is a bottom view of a sealing component according to one embodiment of this invention.
Figure 9:
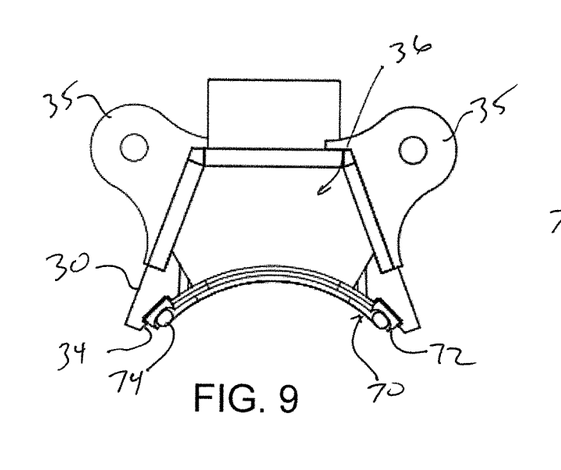
FIGS. 9-10 show a sectional view of the sealing component according to FIG. 8.
Figure 10:
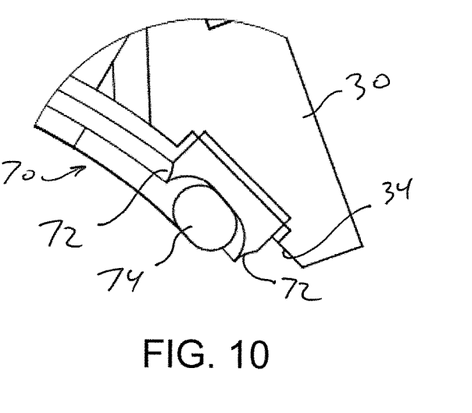

As illustrated, the device 20 includes vent 60. The sealing component 30 further includes a cavity 36 to which the vent 60 is connected. As illustrated, the vent 60 includes two connection branches 62 to the top of cavity 36. The cavity 36 is surrounded by a peripheral surface 34 that is curved to fit against the pipe 100. Gas from the leak enters the cavity 36 during clamping and is vented out, promoting efficient connection with the pipe 100. The vent 60 further includes a valve 64 for closing the vent 60 upon full attachment of the device 20. As illustrated, the frame 45 is connected to the vent branches 62 to promote a compact design.

In embodiments of this invention, the sealing component 30 further includes a sealing element disposed about the sealing component surface contacting the pipe 100. The sealing element desirably extends about the periphery of the sealing component surface, such as on and around the peripheral surface 34. In embodiments of this invention, the sealing element can be a metal rib and/or a sealing gasket.

FIGS. 8-12 illustrate a sealing element 70 according to embodiments of this invention. The sealing element 70 includes a metal rib 72 and a rubber gasket 74 that extend around the peripheral surface 34 of the sealing component 30. The sealing element 70 includes two metal ribs 72 with the rubber gasket disposed there between. The sealing element can include a single rib, or just the gasket, or equivalent, depending on need.

Figure 11:
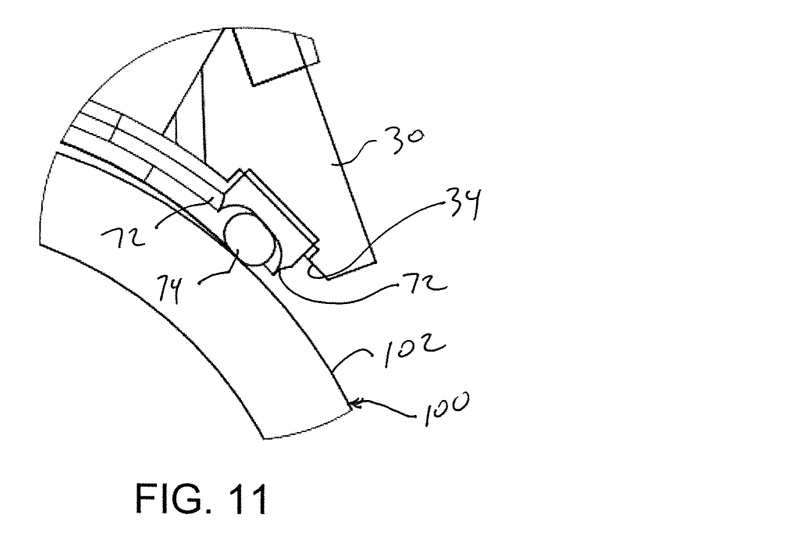
FIGS. 11-12 show a use of the sealing component according to FIG. 8.
Figure 12:
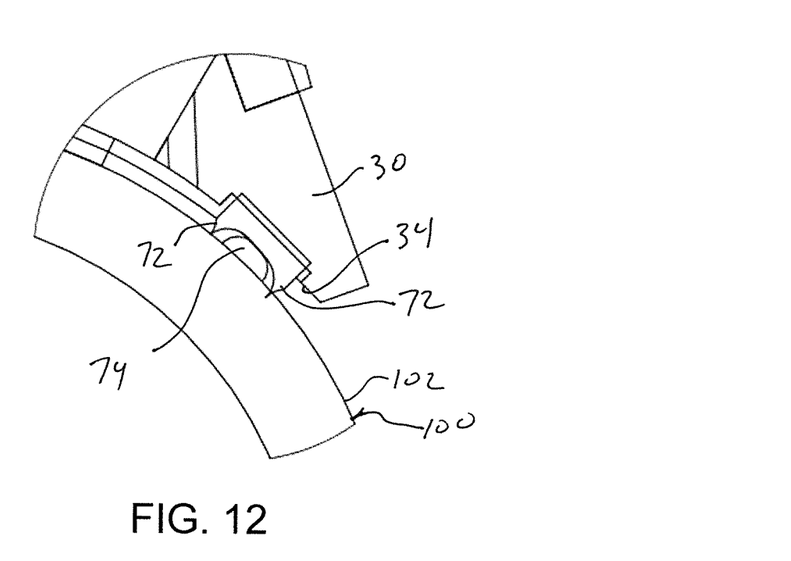

The metal rib(s) 72 acts as a main sealing apparatus on the clamp device 20 as the metallic rib 72 is pushed or digs against a plastic pipe wall 102 of the damaged pipe 100 when the clamp device 20 is activated to close the clamp 40. The metallic rib 72 can puncture into the plastic pipe outer surface 102, forming a primary seal for the pipe leak. FIGS. 11-12 show a progression of sealing the pipe 100 with both the metallic rib 72 and the rubber gasket 74. As the metallic rib 72 pushes against the pipe wall 102, at least one rib 72 punctures into the pipe wall 102. Additionally, the metallic rib 72 forces the rubber gasket 74 against or even into the pipe wall 102 to provide a secondary sealing layer for additional security. The pistons 46, 48 are dually used to create and/or maintain an even tighter seal between the clamp device 20 and the pipe 100.

Figure 13:
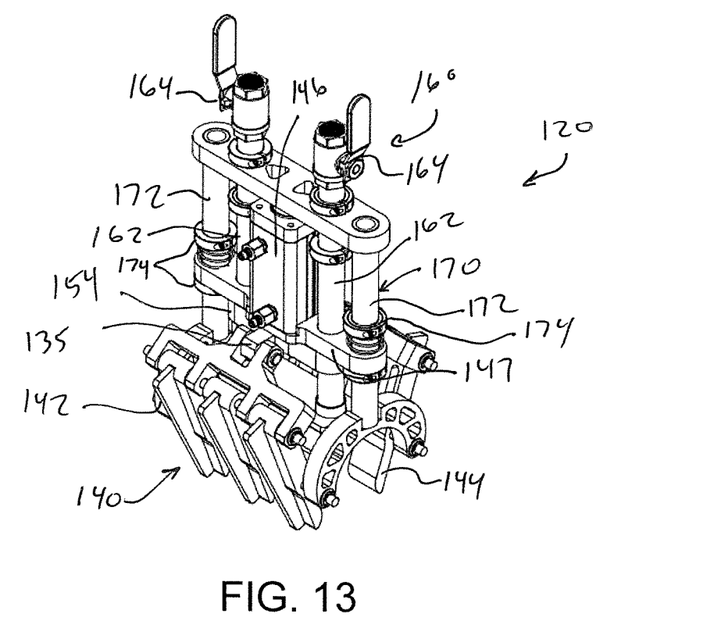
FIGS. 13 and 14 show a clamp device according to one embodiment of the invention in a first, open position.
Figure 14:
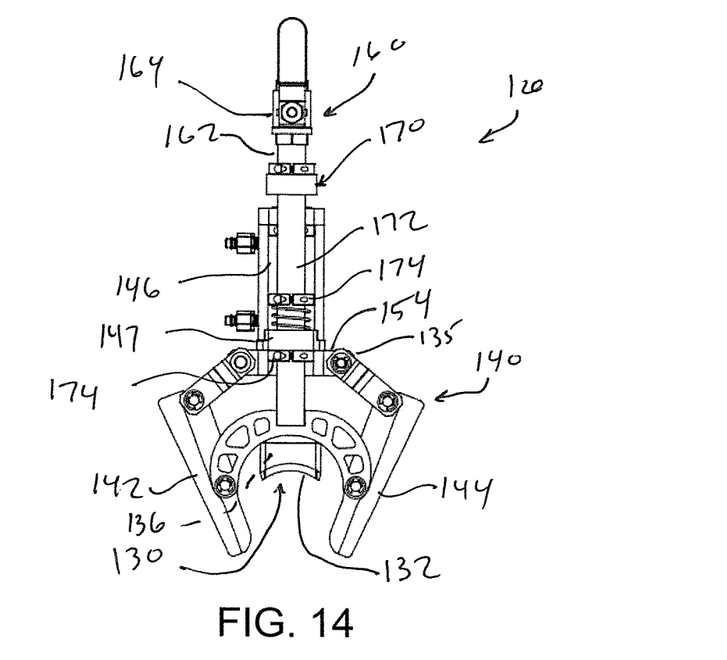
Figure 22:
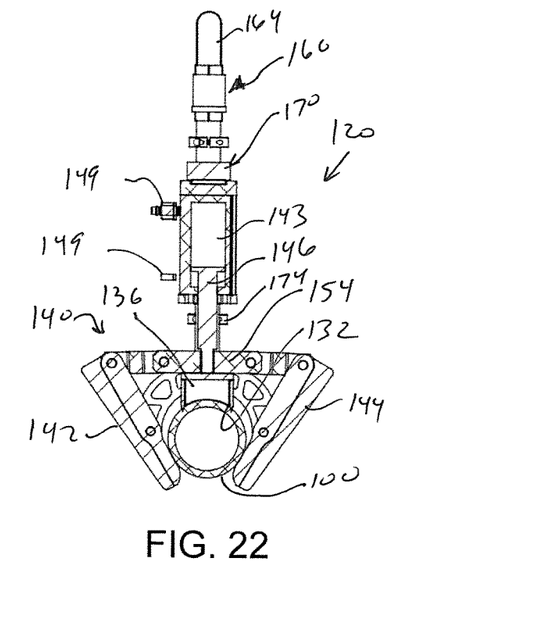
FIGS. 22 and 23 are sectional views of the clamp device shown in FIG. 21.

FIGS. 13-20 show a device 120 according to one embodiment of this invention. The device 120 includes a sealing component 130 that is configured to fit over and cover a leak. The sealing component 130 again includes a curved surface 132 that corresponds to the curvature of the outer surface 102 of the pipe 100, such as shown in FIGS. 14 and 22.

Figure 15:
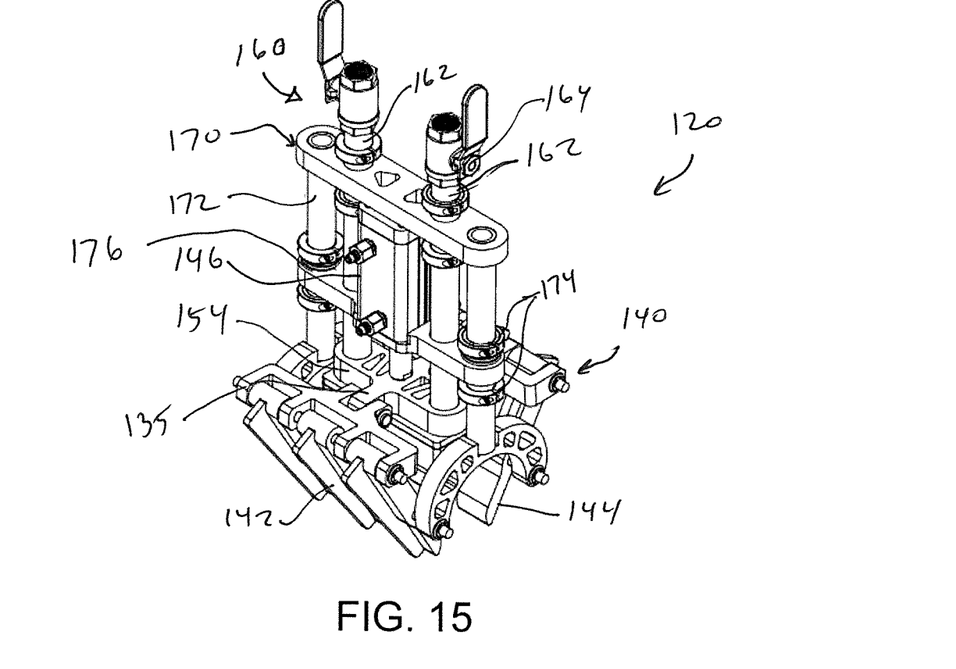
FIGS. 15 and 16 show the clamp device of FIGS. 13 and 14 in a second, closed position.
Figure 16:
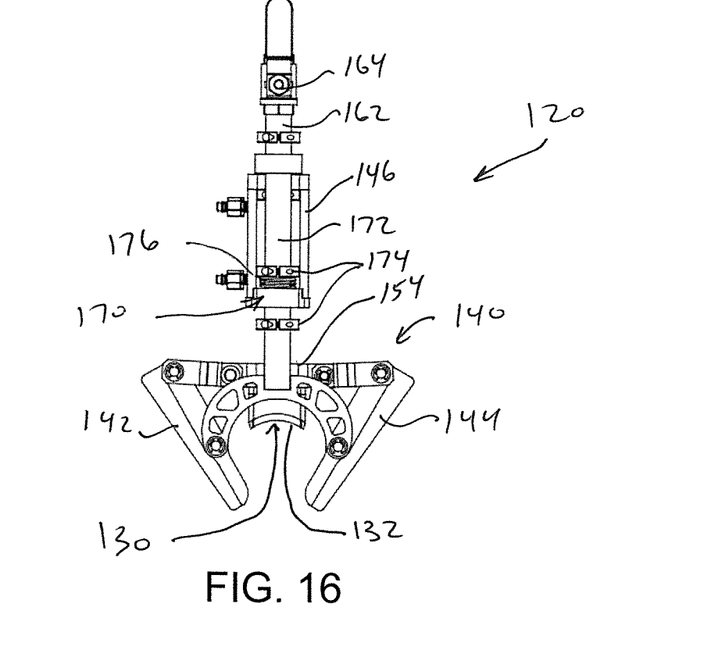

The device 120 includes a clamp 140 connected to and extending from the sealing component 130. The clamp 140 includes clamp arms 142 and 144, each disposed on opposing sides of the sealing component 130. Each clamp arm 142, 144 is pivotably mounted to and/or about the sealing component 130. In this embodiment, the clamp arms 142, 144 are indirectly connected to the sealing component 130, and are each formed of two pivoting sub-arm components. A clamp plate 154 includes flanges 135 extending outward relative to opposing sides of the clamp plate 154. The clamp plate 154 is connected to an actuator that controls the open and closing movement of the clamp arms 142, 144. FIGS. 13 and 14 show the clamp plate 154 in the pre-clamped position, with the clamp plate 154 against the actuator. FIGS. 15 and 16 shows the clamp arms 142, 144 in a closed position (without a pipe), with the clamp plate 154 moved away from the actuator by a piston 146, which causes the clamp arms 142, 144 to close around a pipe and pull the pipe and sealing component 130 together.

In the illustrated embodiment, the actuator includes a single piston 146, arranged generally vertically, and connected between the clamp plate 154 and a frame 170 or other support component of the device 120. The piston 146 is again desirably a hydraulic or pneumatic piston, controlled and powered by any suitable control device (not shown). In the illustrated embodiment, the clamp arms 142, 144 are pivotable connected to the frame 170, such as at the end of each opposing frame leg 172.

In the illustrated embodiment, the piston 146 is embodied as a piston assembly that includes a piston plate 147 that is connected around, and moveable on, opposing frame legs 172 of frame 170. The piston plate 147 is moveable between two stops, for example, upper and lower collars 174, disposed on each frame leg 172. A compressive force, provided by springs 176, is applied to the piston plate 147. The clamp plate 154 is connected to the piston assembly via the piston 146, such that the clamp plate 154 is moveable with the piston assembly on the frame legs 172.

The device 120 includes vent 160, and more particularly two separate vent stacks 162. The sealing component 130 further includes a cavity 136 to which the vent stacks 162 are connected. The vent stacks 162 can also be connected as shown in FIG. 1, if desired. The cavity 136 is surrounded by a peripheral surface 134 that is curved to fit against the pipe 100. Gas from the leak enters the cavity 136 during clamping and is vented out, promoting efficient connection with the pipe 100. Each vent stack 162 includes a valve 164 for closing the respective vent stack 162 upon full attachment of the device 120. As illustrated, the frame 170 is connected around the vent stacks 162 to promote a compact design, and the vent 160 is moveable within, or 'floats' within, the frame 170, as discussed further below.

Figure 17:
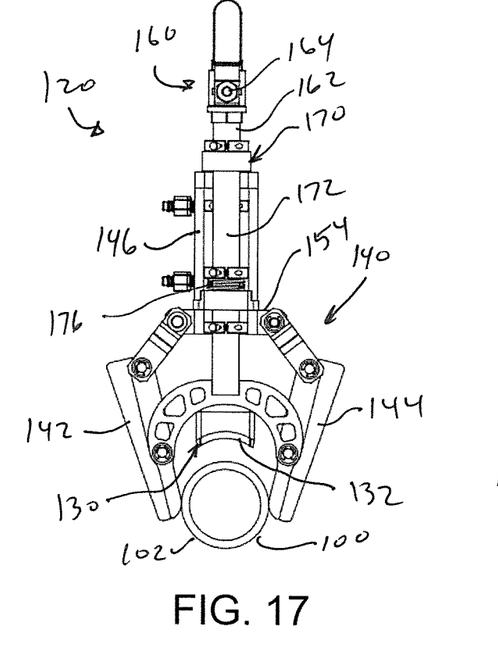
FIGS. 17-21 show the clamp device of FIGS. 13-16 in operation.
Figure 18:
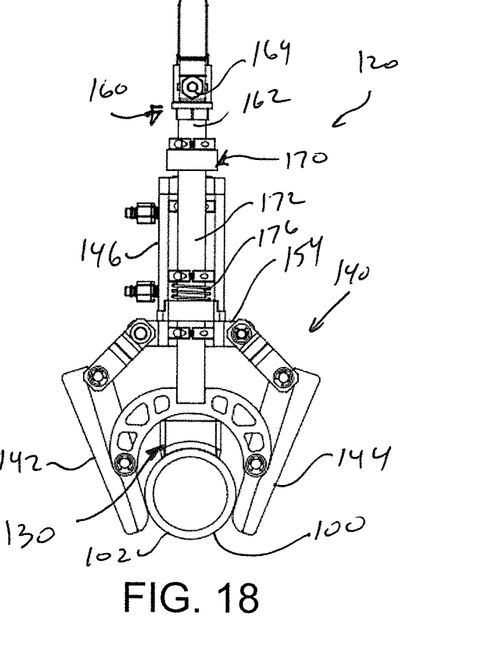
Figure 19:
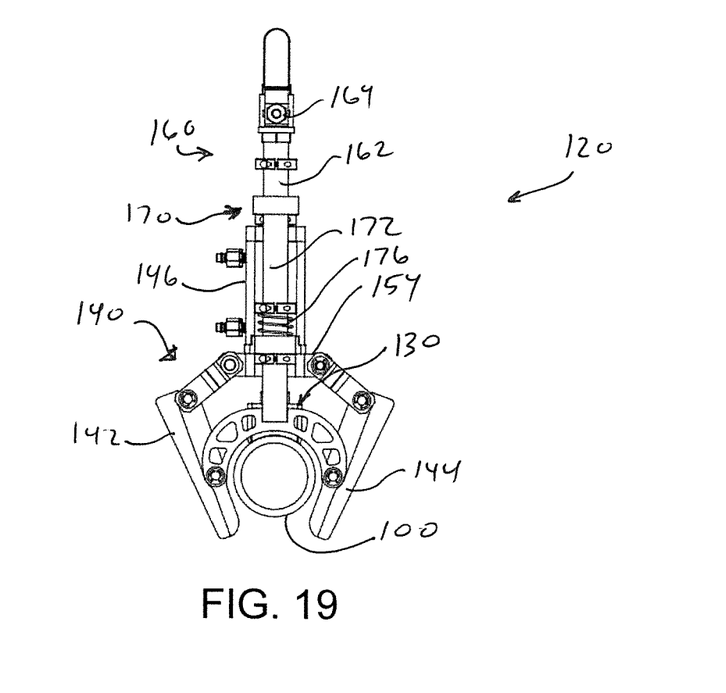

FIGS. 17-23 illustrate the device 120 in operation. FIGS. 17-19 show initial mechanical actions, based upon forces of the spring 176. FIG. 17 shows the clamp arms 142, 144 engaging the pipe 100. In this embodiment, before use, the clamp arms 142, 144 are separated at ends by a distance less than a diameter of the pipe 100. Engaging the pipe 100 pushes the clamp arms 142, 144 apart, which collectively pushes the clamp 140 and the actuator up the frame legs 172, as shown in FIG. 17, compressing the springs 176. In FIG. 18, as the clamp arms 142, 144 move around the pipe 100, the compressive spring forces of the springs 176 push the clamp 140 and actuator back toward the original position (e.g., FIGS. 13-14), as shown in FIG. 19. FIG. 18 shows the clamp arms 142, 144 slightly around the pipe 100. By this movement over the pipe the sealing component 130 is placed over the leak, against the pipe 100. FIG. 19 shows the clamp arms fully around the pipe, with the spring 176 in the original position of FIG. 14, which causes the sealing component 130 to raise relative to the frame 170.

Figure 20:
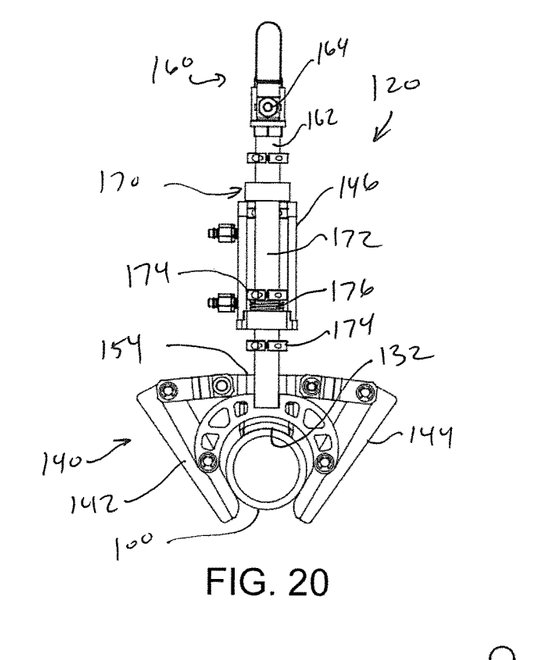
Figure 21:
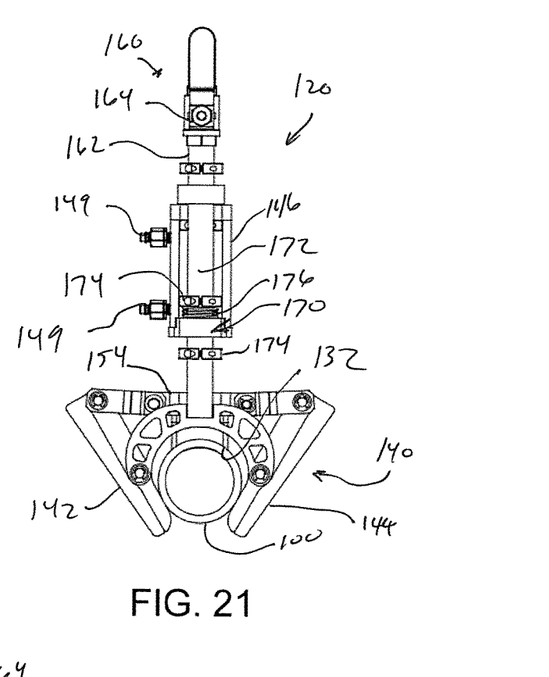
Figure 23:
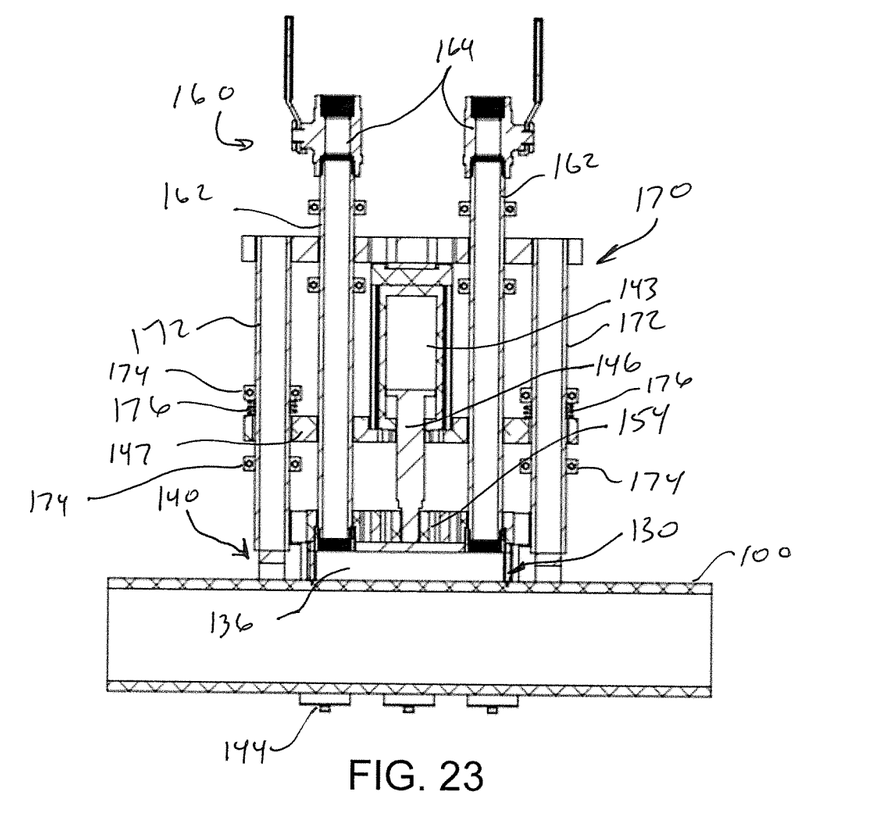

FIGS. 20-21 shows a second stage hydraulic or pneumatic action of the device 120. In FIG. 20, the piston pushes the clamp plate 154 to close the clamp arms 142, 144 around the pipe 100. FIG. 21 shows the final position, where the piston 146 has closed the clamp arms 142, 144 around the pipe 100 to seal the cavity over the leak, such as using the blade rib(s) and/or gasket discussed above. The spring 176 has again been compressed by the action of the piston 146 against the pipe 100. FIGS. 22-23 show sectional views of the closed device, including actuator internals of a piston chamber 143, connected to piston line inlets/outlets 149.

Thus the invention provides a portable leak closing clamp that can be more easily used to cover pipe leaks in the field. The clamp device provides for temporary use while a more detailed, robust repair plan can be determined, while minimizing customer disruption.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A device for sealing a leak in a pipe, the device comprising:
    a sealing component including a peripheral surface curved to fit against the pipe; and
    a clamp extending from the sealing component, the clamp including a clamp arm extending from the sealing component on each of opposing sides of the peripheral surface, each clamp arm including a first end pivotally connected to the sealing component and a second end extending outward from the sealing component.

2. The device of claim 1, wherein the peripheral surface is adapted to fit about the leak.

3. The device of claim 1, wherein the sealing component defines a cavity configured to be disposed between the sealing member and the pipe, and the peripheral surface extends about the cavity.

4. The device of claim 1, further comprising a vent connected to the sealing component, the vent including a valve.

5. The device of claim 4, wherein the peripheral surface extends about a cavity defined by the sealing component, wherein the cavity is between the sealing component and the leak, and the vent is connected to the cavity.

6. The device of claim 4, wherein the vent comprises a vent stack extending from the sealing component, and the valve is toward an end of the vent stack that is opposite the sealing component.

7. The device of claim 1, wherein the clamp is configured to clamp partially about the pipe to secure the peripheral surface against the pipe and the sealing component over the leak.

8. The device of claim 1, further comprising an actuator connected to the sealing component and connected to the clamp arms, and configured to move the clamp arms against the pipe.

9. The device of claim 1, wherein the peripheral surface comprises a metallic blade rib configured to puncture into an outer surface of the pipe upon clamping.

10. The device of claim 9, further comprising a hydraulic or pneumatic actuator connected to the clamp, wherein hydraulic or pneumatic forces on the clamp drives the metallic blade rib partially into the surface of the pipe.

11. The device of claim 1, wherein the peripheral surface comprises a gasket.

12. The device of claim 1, wherein the peripheral surface comprises two metallic blade ribs configured to set into an outer surface of the pipe upon clamping, and a gasket between the two metallic blade ribs.

13. A device for sealing a leak in a pipe, the device comprising:
    a sealing component configured to extend over the leak;
    a clamp pivotably connected at a first end to the sealing component, and including a second end extending outward from the sealing component, the clamp configured to clamp partially around a circumference of the pipe and secure the sealing component against the pipe; and
    a vent configured to release gas from the leak while the sealing component is being secured to the pipe.

14. The device of claim 13, wherein the clamp comprises at least two clamp arms each pivotably connected at a first end to a corresponding one of opposing sides of the sealing component.

15. The device of claim 14, further comprising a hydraulic or pneumatic actuator comprising a first piston connected to a first of the clamp arms and a second piston connected to a second of the clamp arms.

16. The device of claim 13, further comprising:
    a metallic blade rib extending about the sealing component as a first seal to contain the leak; and
    a rubber gasket extending about the sealing component and adjacent the metallic blade rib as a second seal to contain the leak.

17. The device of claim 13, wherein the sealing component comprises two blade metallic ribs extending about a periphery and configured to set into an outer surface of the pipe upon clamping, and a gasket between the two metallic blade ribs.

18. The device of claim 13, wherein the sealing component includes a cavity, the vent is connected to the cavity, and the vent includes a closable valve.

19. The device of claim 18, wherein a metallic blade rib extends about the cavity as a seal to contain the leak, wherein the clamp is configured to clamp partially around the pipe to secure the metallic blade rib against the pipe and the sealing component over the leak.

* * * * *